(12) United States Patent
Jeong et al.

(10) Patent No.: US 12,050,899 B2
(45) Date of Patent: Jul. 30, 2024

(54) UPDATE MANAGEMENT APPARATUS FOR VEHICLE AND METHOD THEREOF

(71) Applicants: Hyundai Motor Company, Seoul (KR); Kia Corporation, Seoul (KR)

(72) Inventors: Hyeok Sang Jeong, Gyeonggi-do (KR); Myeong Gyu Jeong, Seoul (KR); Jin Ah Kim, Gyeonggi-do (KR); Yoon Sik Jung, Seoul (KR); Hak Jun Kim, Gyeonggi-do (KR); Dong Youl Lee, Seoul (KR); Young Jee Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 225 days.

(21) Appl. No.: 17/719,786

(22) Filed: Apr. 13, 2022

(65) Prior Publication Data

US 2023/0052548 A1 Feb. 16, 2023

(30) Foreign Application Priority Data

Aug. 13, 2021 (KR) .................. 10-2021-0107196

(51) Int. Cl.
 *G06F 8/65* (2018.01)
 *B60W 50/14* (2020.01)
 *G07C 5/02* (2006.01)
 *B60W 50/00* (2006.01)

(52) U.S. Cl.
 CPC .............. *G06F 8/65* (2013.01); *B60W 50/14* (2013.01); *G07C 5/02* (2013.01); *B60W 2050/0083* (2013.01); *B60W 2510/244* (2013.01); *B60W 2540/215* (2020.02)

(58) Field of Classification Search
 None
 See application file for complete search history.

(56) References Cited

U.S. PATENT DOCUMENTS

| | | | |
|---|---|---|---|
| 9,152,408 B2 | 10/2015 | Murata et al. | |
| 9,904,597 B2 | 2/2018 | Freedman et al. | |
| 10,990,379 B2 | 4/2021 | Miura | |
| 11,281,455 B2 | 3/2022 | Jeong et al. | |
| 2003/0137786 A1* | 7/2003 | Hasegawa | H02H 9/001 361/10 |
| 2013/0132939 A1 | 5/2013 | Murata et al. | |

(Continued)

FOREIGN PATENT DOCUMENTS

| | | |
|---|---|---|
| EP | 2586662 B | 7/2018 |
| JP | 2020-030607 A | 2/2020 |

(Continued)

*Primary Examiner* — Philip Wang
(74) *Attorney, Agent, or Firm* — Fox Rothschild LLP

(57) ABSTRACT

An update management apparatus for a vehicle includes: a first cooperative controller configured to first determine whether a vehicle controller is updatable based on a state of a low-voltage battery at a predetermined interval during vehicle driving; a management controller configured to receive a first determination result from the first cooperative controller, and when the vehicle controller is updatable, to request user approval during ignition-off of the vehicle, to update the vehicle controller; and a second cooperative controller configured to display an approval window for the user approval.

18 Claims, 6 Drawing Sheets

(56) References Cited

U.S. PATENT DOCUMENTS

| | | | |
|---|---|---|---|
| 2020/0065087 A1* | 2/2020 | Miura | H04L 67/34 |
| 2020/0192655 A1* | 6/2020 | Jeong | G06F 8/71 |
| 2020/0272451 A1* | 8/2020 | Inoue | B60W 50/045 |
| 2020/0371773 A1* | 11/2020 | Kato | G01C 21/3885 |
| 2021/0081192 A1 | 3/2021 | Jeong et al. | |
| 2021/0232382 A1 | 7/2021 | Miura | |
| 2023/0033167 A1* | 2/2023 | Sakurai | G06F 8/65 |
| 2023/0102795 A1* | 3/2023 | Zhu | G06F 9/4856 |
| | | | 718/102 |

FOREIGN PATENT DOCUMENTS

| | | | |
|---|---|---|---|
| JP | 2020-135578 A | | 8/2020 |
| JP | 2021012428 A | * | 2/2021 |
| KR | 2021-0033308 A | | 3/2021 |

* cited by examiner

UPDATE MANAGEMENT APPARATUS FOR VEHICLE AND METHOD THEREOF

CROSS-REFERENCE TO RELATED APPLICATION

This application claims under 35 U.S.C. § 119(a) the benefit of Korean Patent Application No. 10-2021-0107196, filed in the Korean Intellectual Property Office on Aug. 13, 2021, the entire contents of which are incorporated herein by reference.

BACKGROUND

(a) Technical Field

The present disclosure relates to an update management apparatus for a vehicle and a method thereof, more particularly, to a technique for updating a vehicle controller based on a battery state.

(b) Description of the Related Art

Due to rapid development of vehicle-related technologies, newer vehicles are equipped with controllers for controlling various electronic functions such as an ABS, an EPS, and an ADAS. A continuous management ability of installed software is very important for maintenance and management of each controller, and thus a software update technique through over the air (OTA) is being developed to quickly and continuously respond to bugs, glitches, and changing laws and regulations.

In the case of software of controllers for performing an autonomous driving function, a frequency of update typically is higher than that of the software of other controllers due to frequent function improvement according to the driving environment, customer-customized ride & handling (R&H) calibration, etc. Accordingly, there is a need for a technique for efficiently updating the controllers that perform the autonomous driving function.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure provides an update management apparatus for a vehicle and a method thereof, capable of determining whether update is executable in advance before receiving an update approval from a user and re-determining whether the update is executable immediately before the update is executed, thereby improving reliability of the determination of whether it is executable and minimizing a case of update start failure after user approval.

The technical objects of the present disclosure are not limited to the objects mentioned above, and other technical objects not mentioned can be clearly understood by those skilled in the art from the description of the claims.

An exemplary embodiment of the present disclosure provides an update management apparatus for a vehicle, including: a first cooperative controller configured to first determine whether a vehicle controller is updatable based on a state of a low-voltage battery at a predetermined interval during vehicle driving; a management controller configured to receive a first determination result from the first cooperative controller, and when the vehicle controller is updatable, to request user approval during ignition-off of the vehicle, to update the vehicle controller; and a second cooperative controller configured to display an approval window for the user approval.

In an exemplary embodiment, the first cooperative controller, after completing the user approval for updating the vehicle controller, may secondly determine whether the vehicle controller is updatable based on a currently measured consumption current value.

In an exemplary embodiment, the management controller, when it is determined that the vehicle controller is updatable as a result of the second determination, may update the vehicle controller.

In an exemplary embodiment, the management controller, when it is determined that the vehicle controller is not updatable as a result of the second determination, may notify a user that update of the vehicle controller has failed without updating the vehicle controller.

In an exemplary embodiment, the management controller may transmit at least one of an estimated update time, an additional consumption current value during the update, or a temporary threshold state of charge (SOC) setting value to the first cooperative controller.

In an exemplary embodiment, the management controller may calculate the estimated update time by adding a number of reprogramming retries or rollbacks to a reprogramming time of the vehicle controller.

In an exemplary embodiment, the management controller may calculate the additional consumption current during the update by using an additional consumption current consumed during reprogramming for each vehicle controller, an estimated reprogramming time for each vehicle controller, and the estimated update time.

In an exemplary embodiment, the management controller, may receive the temporary threshold SOC setting value from a server.

In an exemplary embodiment, the first cooperative controller may determine whether the vehicle controller is updatable based on at least one of an estimated update time, an additional consumption current value during update, or a temporary threshold SOC setting value.

In an exemplary embodiment, the first cooperative controller, during the first determination, may calculate a consumed battery capacity by using a predetermined consumption current and the additional consumption current received from the management controller, and may calculate an estimated battery capacity when the update is ended by subtracting the consumed battery capacity from a current battery charge capacity.

In an exemplary embodiment, the first cooperative controller may determine whether it is updatable by comparing the estimated battery capacity when the update is ended with the temporary threshold SOC setting value received from the management controller.

In an exemplary embodiment, the first cooperative controller, during the second determination, may calculate a consumed battery capacity by using an additional consumption current measured and the additional consumption current received from the management controller, and may calculate an estimated battery capacity when the update is ended by subtracting the consumed battery capacity from a current battery charge capacity.

In an exemplary embodiment, the management controller may request the second cooperative controller to be ready to display an approval window when it is determined that the vehicle controller is updatable as a result of the first determination while driving the vehicle.

In an exemplary embodiment, the management controller may request display of the approval window when the vehicle ignition is off.

In an exemplary embodiment, the management controller may be ready to update the vehicle controller after receiving the user approval when the vehicle ignition is off, and may recommend limiting use of an electric load to a user.

In an exemplary embodiment, the first cooperative controller includes a battery management system, and the second cooperating controller may include a display.

An exemplary embodiment of the present disclosure provides an update management apparatus for a vehicle, including: a processor configured to first determine whether update of the vehicle controller is executable based on a state of a low-voltage battery at a predetermined interval during vehicle driving, and when the update of the vehicle controller is executable, to execute the update of the vehicle controller by requesting user approval after ignition-off of the vehicle; and an interface device configured to display an approval window for the user approval.

In an exemplary embodiment, the processor, when receiving the user approval for updating the vehicle controller, may secondly determine whether the vehicle controller is updatable based on a currently measured consumption current value.

In an exemplary embodiment, the processor when it is determined that the vehicle controller is updatable as a result of the second determination, may update the vehicle controller, and when it is determined that the vehicle controller is not updatable as a result of the second determination, may notify a user that update of the vehicle controller has failed without updating the vehicle controller.

An exemplary embodiment of the present disclosure provides an update management method for a vehicle, including: first determining whether a vehicle controller is updatable based on a state of a low-voltage battery at a predetermined interval during vehicle driving; requesting user approval after ignition-off of the vehicle when the vehicle controller is updatable; displaying an approval window for the user approval; when receiving the user approval for updating the vehicle controller, second determining whether the vehicle controller is updatable based on a currently measured consumption current value; and when it is determined that the vehicle controller is updatable as a result of the second determination, updating the vehicle controller.

According to the present technique, it is possible to determine whether update is executable in advance before receiving an update approval from a user and to re-determine whether the update is executable immediately before the update is executed, thereby improving reliability of the determination of whether it is executable and minimizing a case of update start failure after user approval.

In addition, various effects that can be directly or indirectly identified through this document may be provided.

DETAILED DESCRIPTION OF THE EMBODIMENTS

Figure 1:
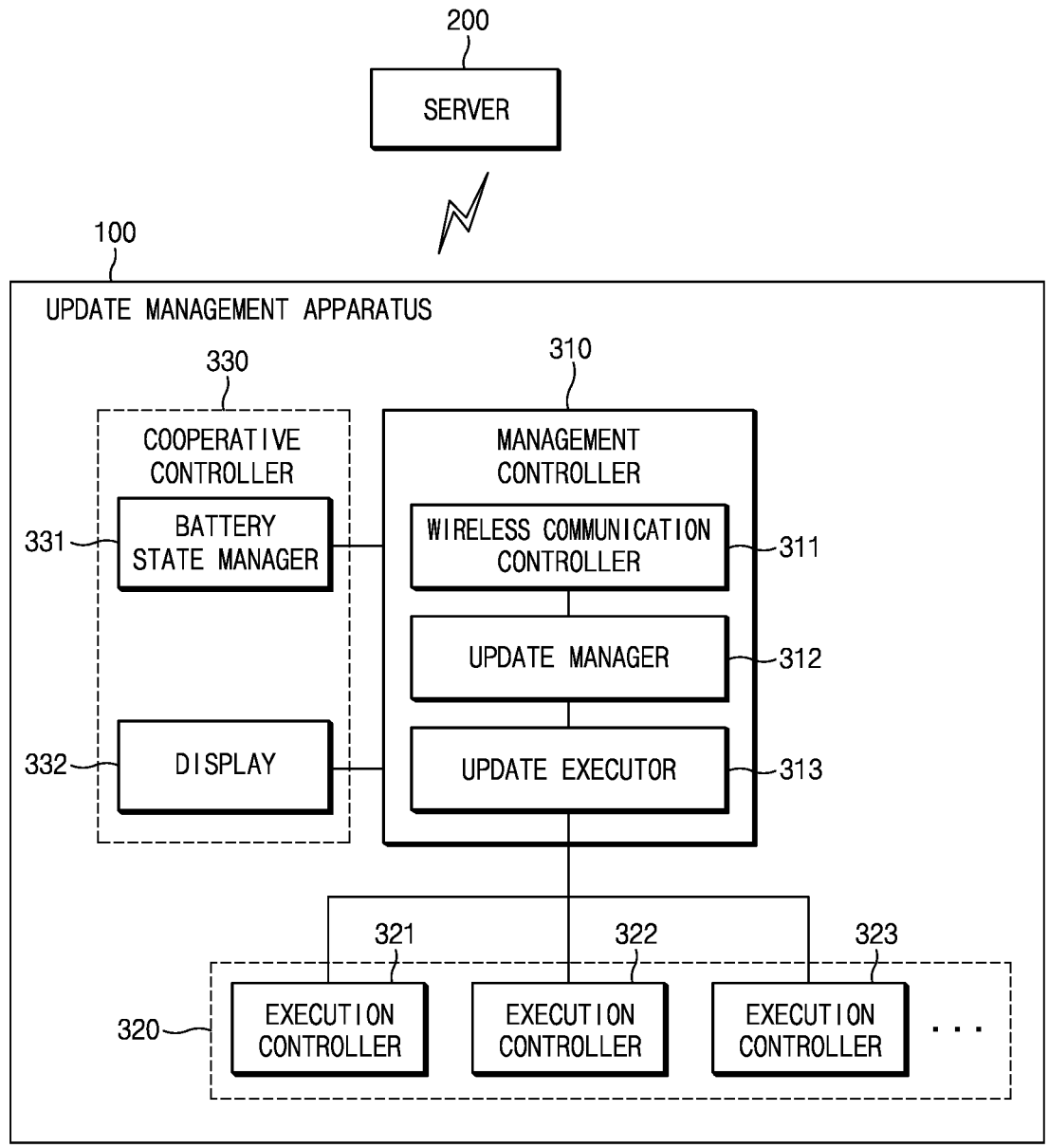
FIG. 1 illustrates a block diagram showing a configuration of a system including an update management apparatus for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 6.

FIG. 1 illustrates a block diagram showing a configuration of a vehicle system including an update management apparatus for a vehicle according to an exemplary embodiment of the present disclosure.

The update management apparatus 100 performs an over-the-air (OTA) update of at least one controller 320 in an ignition-off state of the vehicle, and uses a low-voltage battery as a power source when performing the update. The low-voltage battery has a limited capacity, so it may be insufficient to update several controllers at the same time. Accordingly, the update management apparatus 100 should limit the use of the low-voltage battery in the ignition-off state, calculate an update time, and predict a battery state when the update is ended. Thus, the update management apparatus 100 may determine whether the update is executable before starting the update based on the battery state and a minimum required state for starting performance of the battery when the update is ended.

In addition, the vehicle update management apparatus 100 executes the update by receiving user approval after ignition-off, when the update cannot be started immediately after user approval, an update condition of the vehicle is determined again at the time the update is actually started, and when the update condition of the vehicle is changed to impossible, there may be a case where it is necessary to inform the user that the update is not possible even though the update has been approved.

Accordingly, the update management apparatus 100 of the present disclosure may increase reliability of update availability by first determining whether an update is executable before receiving an update approval from the user. In addition, the update management apparatus 100 may cause starting of the update after user approval to fail only in a limited specific situation, thereby minimizing inconvenience caused by a failure of the update after user approval.

The update management apparatus 100 according to the exemplary embodiment of the present disclosure may be implemented inside the vehicle. In this case, the update management apparatus 100 may be integrally formed with internal control units of the vehicle, or may be implemented as a separate device to be connected to control units of the vehicle by a separate connector.

Referring to FIG. 1, the update management apparatus 100 may include a management controller 310, an execution controller 320, and a cooperative controller 330.

The management controller 310 may communicate with the server 200, and may relay information such that at least one application of the execution controllers 321, 322, and 323 can directly exchange information with the server 200.

The management controller 310 serving as a controller in charge of OTA update downloads software from the server 200, and transmits the software to the execution controller 300 to execute reprogramming.

To this end, the management controller 310 may include a wireless communication controller 311, an update manager 312, and an update executor 313.

The wireless communication controller 311 downloads a software package from the server 200, transmits version information, an update result, etc. of the execution controller 320 to the server 200, and receives an update command from the server 200.

The update manager 312 may oversee update execution of the execution controller 320, and may request communication to the wireless communication controller 311.

The update executor 313 may transmit software to the execution controller 320 depending on a command of the update manager 312, and may transmit an update result to the update manager 312.

At least one execution controller 321, 322, and 323 may receive software from the update executor 313 to execute reprogramming.

The cooperative controller 33, which is a device in a vehicle, performs update of the execution controller 320 in cooperation with the management controller 310.

To this end, the cooperative controller 330 may include a battery state manager 331 and a display 332.

The battery state manager 331 may receive an update expected time, an additional consumption current during update, and a temporary threshold state of charge (SOC) setting value from the management controller 310, and may determine whether to execute controller update based on a state of the low-voltage battery.

The display 332 may display an update approval window and a guidance screen for guiding a progress status and result on a screen depending on a request of the management controller 310.

The battery state manager 331 is configured to first determine whether the update of the vehicle controller is executable based on the state of the low-voltage battery at a predetermined interval during vehicle driving.

The management controller 310 may receive a first determination result from the first cooperative controller, and when the update of the vehicle controller is executable, may request user approval during ignition-off of the vehicle, to execute the update of the vehicle controller.

After user approval for updating the vehicle controller is completed, the battery state manager 331 may secondly determine whether the update of the vehicle controller is executable based on a currently measured consumption current value.

The management controller 310 may update the vehicle controller when it is determined that the update of the vehicle controller is executable as a result of the second determination.

When it is determined that the update of the vehicle controller is not executable, the management controller 310 may notify a user that the update of the vehicle controller has failed without executing the update of the vehicle controller. The management controller 310 may transmit at least one of the estimated update time, the additional consumption current value during the update, or the temporary threshold SOC setting value to the first cooperative controller.

The management controller 310 may calculate the estimated update time by adding a number of reprogramming retries or rollbacks to a reprogramming time of the vehicle controller.

The management controller 310 may receive the temporary threshold SOC setting value from the server 200.

The battery state manager 331 may determine whether the update of the vehicle controller is executable based on at least one of the expected update time, the additional consumption current value during the update, or the temporary threshold SOC setting value.

During the first determination, the battery state manager 331 may calculate a consumed battery capacity by using a predetermined consumption current and the additional consumption current received from the management controller, and may calculate an estimated battery capacity when the update is ended by subtracting the consumed battery capacity from a current battery charge capacity.

The battery state manager 331 may determine whether the update is executable by comparing the estimated battery capacity when the update is ended with the temporary threshold SOC setting value received from the management controller.

During the second determination, the battery state manager 331 may calculate a consumed battery capacity by using an additional consumption current measured and the additional consumption current received from the management controller, and may calculate an estimated battery capacity when the update is ended by subtracting the consumed battery capacity from the current battery charge capacity.

When it is determined that the update of the vehicle controller is executable as a result of the first determination while driving the vehicle, the management controller 310 may request a second cooperative controller to be ready to display an approval window.

The management controller 310 may request an interface device to display the approval window when the vehicle ignition is off.

When the vehicle ignition is off, the management controller 310 may be ready to update the vehicle controller after receiving user approval, and may recommend limiting use of an electric load to the user.

Figure 2:
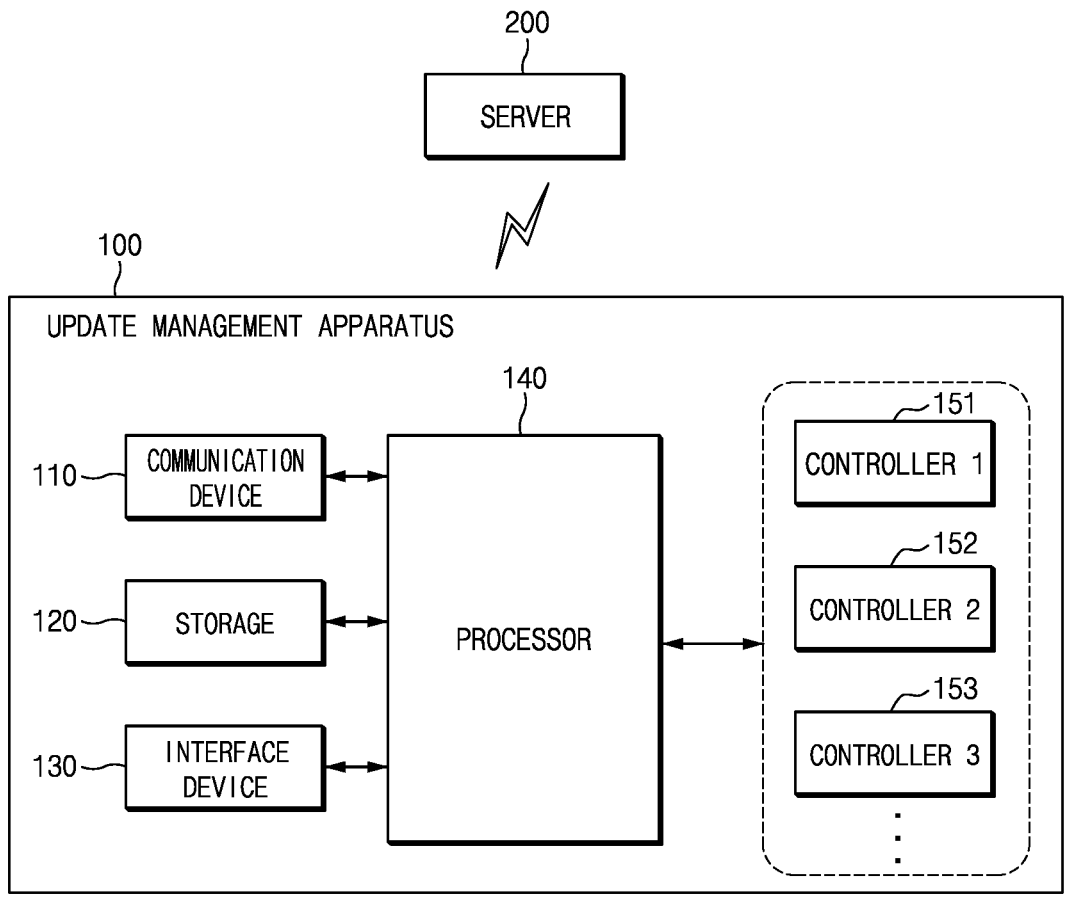
FIG. 2 illustrates an exemplary diagram illustrating a configuration of a vehicle update management apparatus according to another an exemplary embodiment of the present disclosure.

FIG. 2 illustrates a block diagram showing a configuration of a vehicle system including an update management apparatus for a vehicle according to another exemplary embodiment of the present disclosure.

Referring to FIG. 2, a system for updating a vehicle controller according to an exemplary embodiment of the present disclosure includes an update management apparatus 100 for a vehicle and a server 200.

The update management apparatus 100 may include a communication device 110, a storage 120, an interface device 130, a processor 140, and at least one controller 151, 152, and 153.

The update management apparatus 100 according to the exemplary embodiment of the present disclosure may be implemented inside a vehicle path of the vehicle. In this case, the update management apparatus 100 may be integrally formed with internal control units of the vehicle, or may be implemented as a separate device to be connected to control units of the vehicle by a separate connector.

The update management apparatus 100 may minimize update impossible notification to the user by periodically determining whether the update of the vehicle controller is executable and then requesting the user to approve the update while the vehicle is driving.

The update management apparatus 100 may first determine whether the update of the vehicle controller is executable by determining a state of the low-voltage battery based on a predetermined fixed current consumption value for each predetermined period during vehicle driving, when the update of the vehicle controller is executable, may displays an approval window for user approval by requesting the user approval after ignition-off of the vehicle, when receiving user approval for updating the vehicle controller, may secondly determine whether the update of the vehicle controller is executable based on a currently measured consumption current value, and when the update of the vehicle controller is executable, may execute the update of the vehicle controller.

Referring to FIG. 2, the update management apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 110 may perform communication by using a server 200, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 110 may perform wireless communication with the server 200, and may receive data for updating the vehicle controller from the server 200.

The storage 120 may store data and/or algorithms required for the processor 140 to operate, and the like. As an example, the storage 120 may store an estimated update time calculated by the processor 140, an additional consumption current during the update, a temporary threshold SOC setting value, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input device for receiving a control command from a user and an output device for outputting an operation state of the apparatus 100 and results thereof. For example, the interface device 130 may display a user approval request screen (approval window) for the update, and may receive a command for approval from the user. In addition, the interface device 130 may display an update execution process and an update start failure notification screen.

Herein, the input device may include a key button, and may further include a mouse, a joystick, a jog shuttle, a stylus pen, and the like. In addition, the input device may further include a soft key implemented on the display.

The interface device 130 may be implemented as a head-up display (HUD), a cluster, an audio video navigation (AVN), a human machine interface (HM), a user setting menu (USM), or the like.

The output device may include a display, and may further include a voice output device such as a speaker. In this case, when a touch sensor formed of a touch film, a touch sheet, or a touch pad is provided on the display, the display may operate as a touch screen, and may be implemented in a form in which an input device and an output device are integrated. In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the storage 120, the interface device 130, and the like, may electrically control each component, and may be an electrical circuit that executes software commands, thereby performing various data processing and calculations described below.

The processor 140 may process a signal transferred between components of the update management apparatus 100, and may perform overall control such that each of the components can perform its function normally.

The processor 140 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

The processor 140 may first determine whether the update of the vehicle controller is executable based on the state of the low-voltage battery at a predetermined interval during vehicle driving, and when the update of the vehicle controller is executable, may execute the update of the vehicle controller by requesting user approval after ignition-off of the vehicle.

When receiving user approval for updating the vehicle controller, the process 140 may secondly determine whether the update of the vehicle controller is executable based on a currently measured consumption current value.

The process 140 may update the vehicle controller when it is determined that the update of the vehicle controller is executable as a result of the second determination.

When it is determined that the update of the vehicle controller is not executable, the process 140 may notify a user that the update of the vehicle controller has failed without executing the update of the vehicle controller.

The processor 140 may perform functions of the management controller 310 and the battery state manager 330 of FIG. 1, and the display 332 may perform a same function as that of the interface device 130 of FIG. 1.

The controllers 151, 152, and 153 may each be autonomous driving controllers, and may include ADAS PRK, ADAS VP, HDM, and the like.

The controllers 151, 152, and 153 may include at least one application. For example, the controllers 151, 152, and 153 may have at least one application installed for performing an autonomous driving function.

The server 200, which is an OTA server, may transmit data such as software for updating the vehicle controller to the vehicle through communication with the vehicle update management apparatus 100.

The server 200 determines a current event version of the vehicle by receiving version and vehicle information (vehicle type, region, vehicle identification information (VIN)) of software package(s) of the respective controller 321, 322, and 323 from the management controller 310, and designates a target event version based on the current event version, and then transmits a software package download command for executing the update with the corresponding event to the management controller 310. For example, the server 200 may be a cloud server outside the vehicle.

As such, according to the present disclosure, as it determines whether to execute the update by determining the state of the low-battery battery based on the expected update time and various factors before the update, an original function of the low-voltage battery (e.g. starting) may be guaranteed after the update, and approval is requested for the user only when the update is executable, and in a specific situation (vehicle condition or use condition), a fail-safe function operates to ensure reliability of an update execution determination logic.

Figure 3:
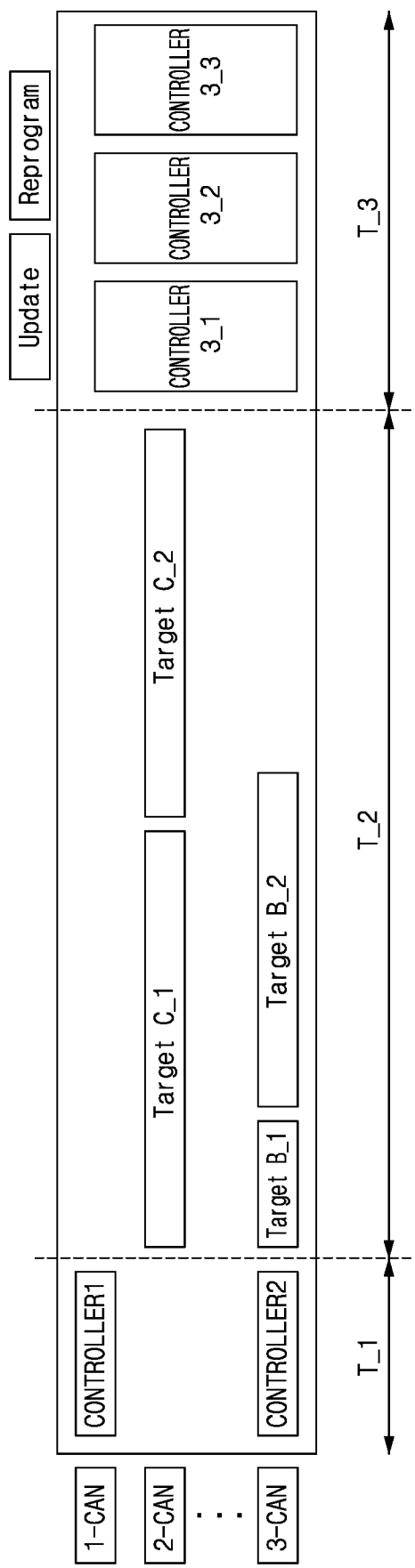
FIG. 3 illustrates a view for describing an example of calculating an update expected time according to an exemplary embodiment of the present disclosure.

FIG. 3 illustrates a view for describing an example of calculating an update expected time according to an exemplary embodiment of the present disclosure.

The vehicle update management apparatus 100 may calculate an expected final update time by referring to FIG. 3 and Equation 1 below.

$$T\_est = (T\_1 + T\_2 + T\_3) * (1 + NRT, NRB) \quad \text{(Equation 1)}$$

T_est indicates a total estimated update time, T_1 indicates a high voltage driving related controller (PE (power electric) controller) and an ICU reprogramming time, T_2 indicates a reprogramming time of controllers other than the high voltage driving related controller, and T_3 indicates a central communication unit (CCU) reprogramming time. NRT (Number ReTry) indicates a number of reprogramming retries, and NRB (Number RollBack) indicates a number of rollbacks. In this case, the vehicle update management device 100 may calculate the update expected time in consideration of the number of retries and the number of rollbacks for each serial and parallel processing.

That is, in the case of being driven by a serial processing method that performs one reprogramming at a time, the update management apparatus 100 calculates the total estimated time by adding the number of retries and the number of rollbacks to the expected time, and in the case of being driven by a parallel processing method that processes that simultaneously performs several reprogrammings, the update management apparatus 100 may calculate the total expected time by using a maximum value (Max) among expected parallel processing times.

The vehicle update management apparatus 100 may calculate the final update expected time by multiplying the total update estimated time T_est by the number of retries or the number of rollbacks.

In addition, the update management apparatus 100 may calculate the additional consumption current during the update by using the additional current consumed during reprogramming and the final estimated update time as shown in Equation 2 below.

$$\begin{aligned}\text{Additional consumption current during}\\ \text{update}&=\text{Additional consumption current during}\\ &\text{reprogramming}*\text{Estimated reprogramming time}/\\ &\text{total estimated time}\end{aligned} \quad \text{(Equation 2)}$$

As shown in Equation 2, the vehicle update management apparatus 100 may calculate an update additional consumption current by multiplying a value obtained by dividing the estimated reprogramming time by the total expected time by the additional consumption current during reprogramming. In this case, the vehicle update management apparatus 100 may receive the additional consumption current and the expected reprogramming time during reprogramming together when receiving the update command from the server 200. In Equation 2, the total estimated time is a value calculated in Equation 1.

For example, in the case where the additional current consumption is 50 A, the estimated reprogramming time is 15 min (including retries and rollback), and the final estimated time is 60 min when reprogramming the EMS, the additional consumption current=50 A*15 min/60 min=12.5 A.

In addition, the update management apparatus 100 may receive a temporary threshold SOC setting value when receiving the update command from the server 200.

The temporary threshold SOC setting value is a reference value for determining a SOC value of the battery when the update is completed, and the SOC value of the battery when the update is completed must be greater than the temporary threshold SOC setting value so that the vehicle can be started when the update is completed. That is, the update management apparatus 100 estimates the SOC value of the battery when the update is completed and compares the estimated SOC value with the temporary threshold SOC setting value to determine whether to execute the update. For example, the update management apparatus 100 may determine that the update is executable when the battery SOC when the update is completed is greater than the temporary threshold SOC setting value.

In this case, in a normal situation, the temporary threshold SOC setting value may be set to 0, and the temporary threshold SOC setting value may be used for a temporary response when the update is not continuously executable due to a battery problem.

For example, when the temporary threshold SOC value is set to 0 in the server 200, a temporary threshold SOC value of 40 to 50% (calibrated so different for each vehicle model) set in an existing vehicle is used, and when the server 200 sets the temporary threshold SOC value other than 0 to the vehicle, the vehicle may prioritize and apply the temporary threshold SOC value received from the server 200.

Figure 4:
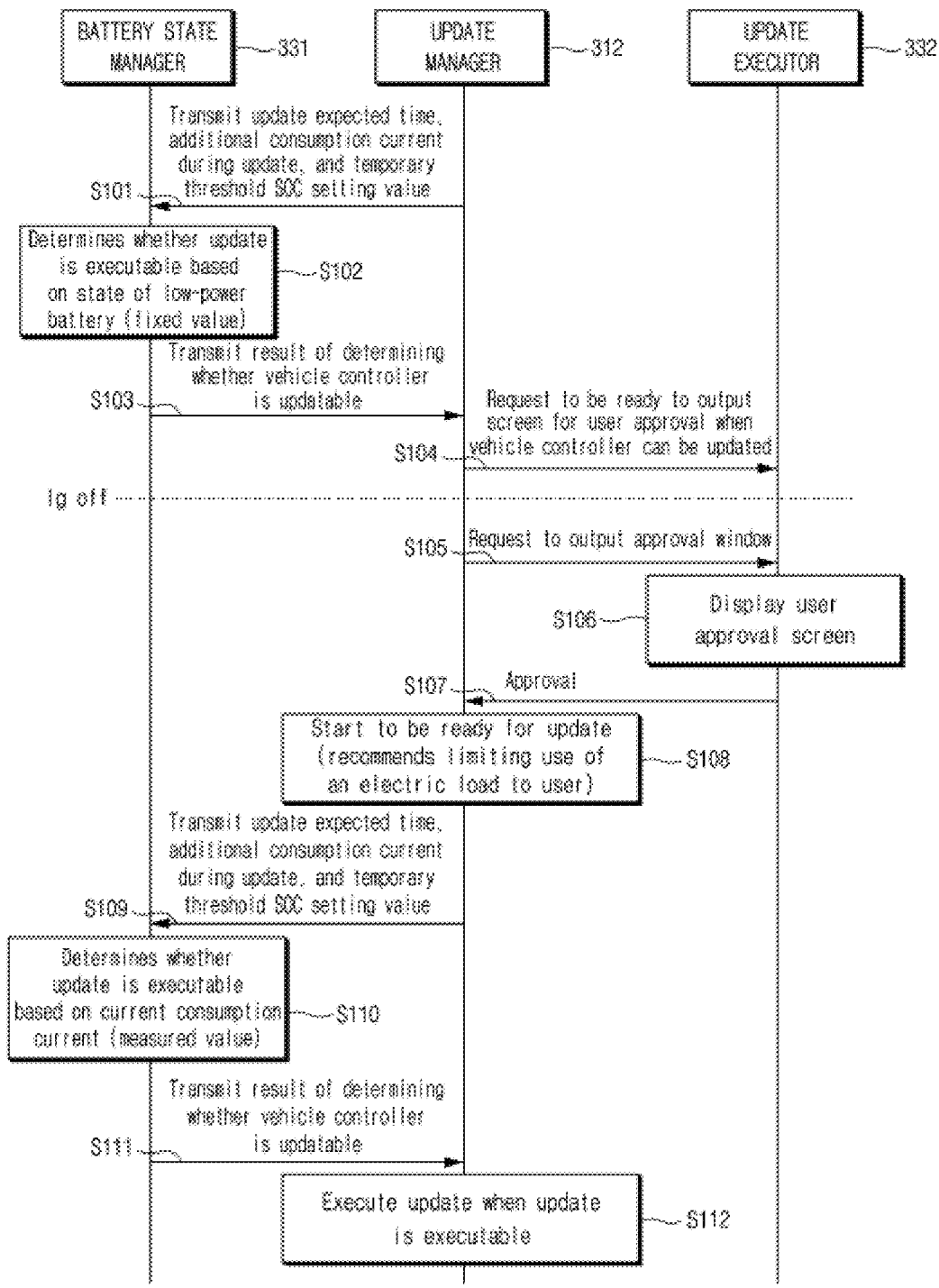
FIG. 4 illustrates a view for describing an update management method for a vehicle according to an exemplary embodiment of the present disclosure.

Hereinafter, an update management method for a vehicle according to an exemplary embodiment of the present disclosure will be described in detail with reference to FIG. 4.

Hereinafter, it is assumed that the battery state manager 331, the update manager 312, and the display 332, which are components of the update management apparatus 100 of FIG. 1, perform the process of FIG. 4.

The update manager 312 of the vehicle update management apparatus 100 transmits an update expected time, an additional consumption current during update, and a temporary threshold SOC setting value to the battery state manager 331 (S101). In this case, the battery state manager 331 calculates and stores a consumption current (fixed value) in advance during the update.

An expected update time may be used to estimate a battery SOC at the end of the update. In addition, the additional consumption current, which is an additional current consumption value during the update after an update execution determination time, may be used as a value added to the update consumption current (fixed value). In this case, the update consumption current, which is a fixed value, may be determined in advance by experimental values.

The update consumption current is a current consumed when the update is actually executed, and although the update consumption current is different for each state of various types of vehicle controllers, a constant value is measured for the update consumption current while driving. Accordingly, the update manager 312 may database the update consumption current while driving the vehicle in advance by testing it, and may fix it as a predetermined value to use it.

The update manager 312 may receive a temporary threshold SOC setting value from the server 200, and when the temporary threshold SOC setting value is 0x0, may ignore the received value to use a value that is in a controller. In the meantime, when OTA execution is not possible due to a problem with a setting value of the battery state manager 331, which is a cooperative controller, the battery state manager 331 as the cooperative controller needs to be updated, but the update is not executable, and thus the threshold SOC setting value received from the server 200 may be used.

The battery state manager 331 determines the state of the low-power battery based on the estimated update time received from the update manager 312, the additional consumption current during the update, the temporary threshold SOC setting value, a self-determined battery fluid temperature, and a current battery charge capacity, and determines whether the update is executable based on the state of the low-power battery (S102).

$$\begin{aligned}\text{Estimated battery level at the end of the}\\ \text{update}&=\text{Current battery charge capacity}-\text{Esti-}\\ &\text{mated update time}*(\text{Update consumption cur-}\\ &\text{rent (fixed value)}+\text{Additional consumption cur-}\\ &\text{rent during the update}=\text{Consumed battery}\\ &\text{capacity})\end{aligned} \quad \text{(Equation 3)}$$

As shown in Equation 3, the battery state manager 331 calculates the consumed battery capacity by adding the pre-stored update consumption current (fixed value) and the additional consumption current received from the update manager 312 during the update, and calculates the expected battery capacity when the update is ended by subtracting the consumed battery capacity from the current battery charge capacity.

Then, as shown in Equation 4 below, the battery state manager 331 may determine whether the calculated estimated battery capacity at the end of the update is greater than the temporary threshold SOC setting value received from the update manager 312, and when it is greater, may determine that the update is executable.

$$\text{Estimated Battery capacity at the end of the update}>\text{Temporary threshold SOC} \quad \text{(Equation 4)}$$

As such, according to the present disclosure, it is possible to enable user to display an approval window only under a condition that the update is definitely executable by determining whether the update is executable in advance while the vehicle is driving.

The battery state manager 331 may transmit a result of determining whether the vehicle controller is updatable to the update manager 312 (S103).

Accordingly, the update manager 312 requests the display 332 to be ready to output a screen (approval window) for user approval when the vehicle controller can be updated based on the determination result received from the battery state manager 331 (S104).

Thereafter, when a vehicle ignition is off, the update manager 312 requests the display 332 to output the approval window (S105).

Accordingly, the display 332 displays the screen (approval window) for user approval (S106), receives approval from the user, and transmits an approval result thereof to the update manager 312 (S107). In this case, setting may be made such that the screen of the display 332 is turned off when the vehicle ignition is off, but the screen of the display 332 is not turned off when the ignition is off in a state in which to be ready for outputting the approval window is requested in advance.

After receiving the user approval from the display 332, the update manager 312 starts to be ready for the update (S108).

In this case, while being ready for the update, the user may be advised to limit use of an electric load, and since the update cannot be started when a specific electric load is used, such conditions may be displayed on the screen through the display 332 to notify the user of it.

Thereafter, the update manager 312 transmits an update expected time, an additional consumption current during update, and a temporary threshold SOC setting value to the battery state manager 331 (S109).

Then, the battery state manager 331 determines whether the update is executable again based on the consumption current (measured value) during the update (S110).

That is, since the low-voltage battery may be excessively discharged due to vehicle conditions and use conditions during a time for being ready to execute the update after ignition off of the vehicle, the battery state manager 331 determines once again whether the update is executable immediately before the update starts. In this case, the battery state manager 331 determines it based on the consumption current (measured value).

Next, the battery state manager 312 transmits a result of determining whether the update is executable in step S110, to the update manager 312 (S111), and when the update is executable, the update manager 312 updates the vehicle controller (S112).

In this case, under a normal condition, a result of step S102 of determining whether the update is executable based on the consumption current (fixed value) during the update is the same as that of step S110 of determining whether the update is executable based on the current consumption current (measured value). However, after step S102, when a user applies an external electric load after the ignition-off and the current consumption is excessive or the current consumption is excessive due to operation of a specific electric load due to a specific vehicle condition, it may be determined that the update cannot be started in a fail-safe format in step S110. In this case, the user can be notified through display 332 that the update cannot be started.

Figure 5:
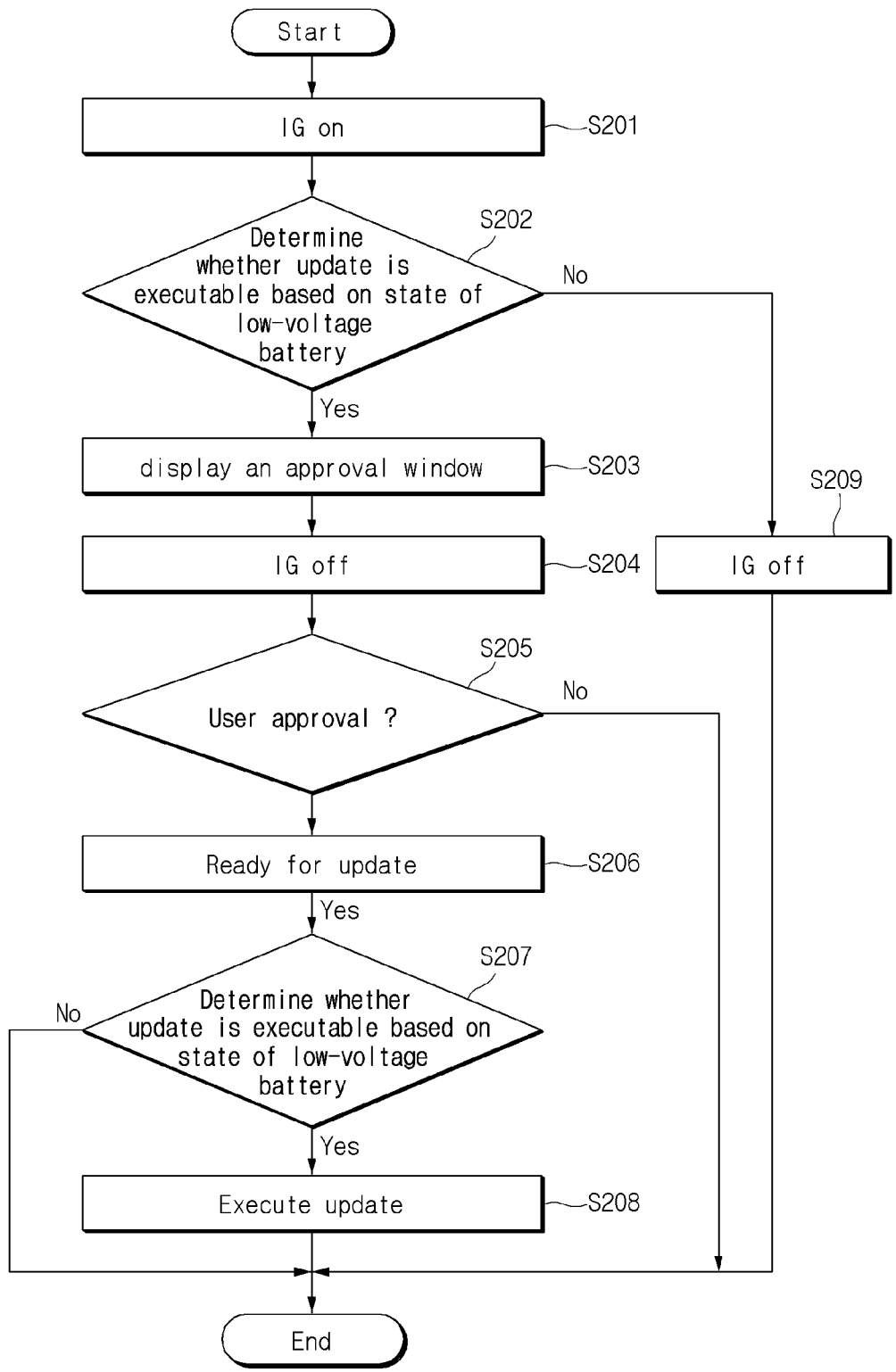
FIG. 5 illustrates a view for describing an update management method for a vehicle according to another exemplary embodiment of the present disclosure.

Hereinafter, an update management method for a vehicle according to an exemplary embodiment of the present disclosure will be described in detail with reference to FIG. 5.

Hereinafter, it is assumed that the update management apparatus 100 of FIG. 2 performs a process of FIG. 5. In addition, in the description of FIG. 5, operations described as being performed by a device may be understood as being controlled by the processor 140 of the update management apparatus 100.

When the ignition of the vehicle is on (S201), the update management apparatus 100 may determine whether the low-voltage battery is in a state in which the vehicle controller can be updated (S202). In this case, the update management apparatus 100 may determine whether the vehicle controller can be updated based on the update consumption current (fixed value).

In the case where it is determined that the update of the vehicle controller is not executable, when the vehicle ignition is off (S209), the update management apparatus 100 ends it.

On the other hand, when it is determined that the update of the vehicle controller is executable, the update management apparatus 100 starts to be ready to display an approval window for updating the vehicle controller (S203), and when the vehicle ignition is off (S204), the approval window is displayed to receive approval for the update of the vehicle controller from the user (S205).

When the user approval is completed, the update management apparatus 100 gets ready to update the vehicle controller (S206), and after the update ready process and before starting the actual update, re-determines whether the low-voltage battery is in an updatable state based on the measured current (S207).

As a result of the determination, when the low-voltage battery is in the state in which the vehicle controller can be updated, the update management apparatus 100 executes the update of the vehicle controller and then ends it (S208).

On the other hand, when it is determined that the low-voltage battery is in the state in which the vehicle controller cannot be updated, the update management apparatus 100 notifies the user of the update start failure state (update cancellation) and ends it.

As such, according to the present disclosure, it may be determined whether the vehicle controller can be updated by determining the state of the low-voltage battery based on various factors such as the expected update time before starting the update of the vehicle controller while driving the vehicle, thereby guaranteeing an original function (starting) of the low-voltage battery after the vehicle controller is updated. In addition, according to the present disclosure, approval may be requested for the user only when the update is executable, and in a specific situation (vehicle condition or use condition), a fail-safe function operates to ensure reliability of an update execution determination logic.

Figure 6:
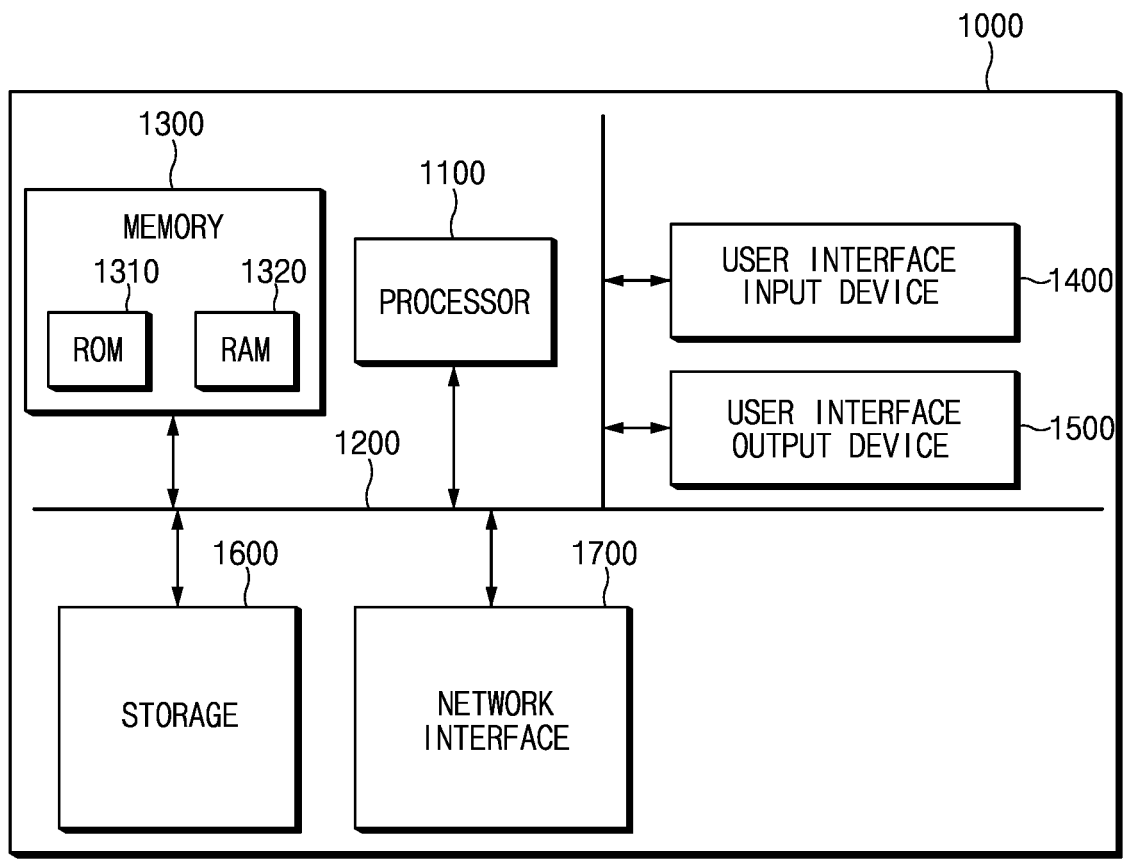
FIG. 6 illustrates a computing system according to an exemplary embodiment of the present disclosure.

FIG. 6 illustrates a computing system according to an exemplary embodiment of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An update management apparatus for a vehicle, comprising:
    a first cooperative controller configured to first determine whether a vehicle controller is updatable based on a state of a low-voltage battery at a predetermined interval during vehicle driving;
    a management controller configured to receive a first determination result from the first cooperative controller, and when the vehicle controller is updatable, to request user approval during ignition-off of the vehicle, to update the vehicle controller; and
    a second cooperative controller configured to display an approval window for the user approval,
    wherein the first cooperative controller, after completing the user approval for updating the vehicle controller, secondly determines whether the vehicle controller is updatable immediately before an update is executed based on a currently measured consumption current value.

2. The update management apparatus of claim 1, wherein the management controller, when it is determined that the vehicle controller is updatable as a result of the second determination, updates the vehicle controller.

3. The update management apparatus of claim 1, wherein the management controller, when it is determined that the vehicle controller is not updatable as a result of the second determination, notifies a user that updating of the vehicle controller has failed without updating the vehicle controller.

4. The update management apparatus of claim 1, wherein the management controller transmits at least one of an estimated update time, an additional consumption current value during an update, or a temporary threshold state of charge (SOC) setting value to the first cooperative controller.

5. The update management apparatus of claim 4, wherein the management controller calculates the estimated update time by adding a number of reprogramming retries or rollbacks to a reprogramming time of the vehicle controller.

6. The update management apparatus of claim 4, wherein the management controller calculates the additional consumption current during the update by using an additional consumption current consumed during reprogramming for each vehicle controller, an estimated reprogramming time for each vehicle controller, and the estimated update time.

7. The update management apparatus of claim 4, wherein the management controller receives the temporary threshold SOC setting value from a server.

8. The update management apparatus of claim 1, wherein the first cooperative controller determines whether the vehicle controller is updatable based on at least one of an estimated update time, an additional consumption current value during an update, or a temporary threshold state of charge (SOC) setting value.

9. The update management apparatus of claim 1, wherein during the first determination, the first cooperative controller:
    calculates a consumed battery capacity by using a predetermined consumption current and the additional consumption current received from the management controller, and
    calculates an estimated battery capacity when an update is ended by subtracting the consumed battery capacity from a current battery charge capacity.

10. The update management apparatus of claim 9, wherein the first cooperative controller determines whether it is updatable by comparing the estimated battery capacity when the update is ended with the temporary threshold SOC setting value received from the management controller.

11. The update management apparatus of claim 9, wherein during the second determination, the first cooperative controller:
    calculates a consumed battery capacity by using an additional consumption current measured and the additional consumption current received from the management controller, and
    calculates an estimated battery capacity when the update is ended by subtracting the consumed battery capacity from a current battery charge capacity.

12. The update management apparatus of claim 1, wherein the management controller requests the second cooperative controller to be ready to display an approval window when it is determined that the vehicle controller is updatable as a result of the first determination while driving the vehicle.

13. The update management apparatus of claim 12, wherein the management controller requests display of the approval window during the ignition off of the vehicle.

14. The update management apparatus of claim 1, wherein the management controller is ready to update the vehicle controller after receiving the user approval during the ignition off of the vehicle, and recommends limiting use of an electric load to a user.

15. The update management apparatus of claim 1, wherein:
    the first cooperative controller includes a battery management system, and
    the second cooperative controller includes a display.

16. An update management apparatus for a vehicle, comprising:
    a processor configured to:
        first determine whether an update of a vehicle controller is executable based on a state of a low-voltage battery at a predetermined interval during vehicle driving, and
        when the update of the vehicle controller is executable, execute the update of the vehicle controller by requesting user approval after ignition-off of the vehicle; and an interface device configured to display an approval window for the user approval, wherein the processor, when receiving the user approval for updating the vehicle controller, secondly determines whether the vehicle controller is updatable immediately before an update is executed based on a currently measured consumption current value.

17. The update management apparatus of claim 16, wherein the processor:
when it is determined that the VEHICLE controller is updatable as a result of the second determination, updates the vehicle controller, and
when it is determined that the vehicle controller is not updatable as a result of the second determination, notifies a user that the update of the vehicle controller has failed without updating the vehicle controller.

18. An update management method for a vehicle, comprising:
first determining whether a vehicle controller is updatable based on a state of a low-voltage battery at a predetermined interval during vehicle driving;
requesting user approval after ignition-off of the vehicle when the vehicle controller is updatable;
displaying an approval window for the user approval;
when receiving the user approval for updating the vehicle controller, second determining whether the vehicle controller is updatable immediately before an update is executed based on a currently measured consumption current value; and
when it is determined that the vehicle controller is updatable as a result of the second determination, updating the vehicle controller.

\* \* \* \* \*